United States Patent
Ghannam et al.

(10) Patent No.: US 11,524,692 B2
(45) Date of Patent: Dec. 13, 2022

(54) RIDESHARING AND AUTONOMOUS VEHICLE SYSTEMS WITH MITIGATION OF RIDE-RELATED PHOBIAS

(71) Applicant: FORD GLOBAL TECHNOLOGIES, LLC, Dearborn, MI (US)

(72) Inventors: Mahmoud Y. Ghannam, Canton, MI (US); John Van Wiemeersch, Novi, MI (US); Aed Dudar, Canton, MI (US); Frank L. Lollo, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 208 days.

(21) Appl. No.: 17/146,733

(22) Filed: Jan. 12, 2021

(65) Prior Publication Data
US 2022/0219710 A1    Jul. 14, 2022

(51) Int. Cl.
*B60W 50/00* (2006.01)
*B60W 60/00* (2020.01)

(52) U.S. Cl.
CPC .... *B60W 50/0098* (2013.01); *B60W 60/0013* (2020.02); *B60W 60/00253* (2020.02); *B60W 2540/043* (2020.02); *B60W 2540/047* (2020.02); *B60W 2540/22* (2013.01)

(58) Field of Classification Search
None
See application file for complete search history.

(56) References Cited

U.S. PATENT DOCUMENTS

| | | | |
|---|---|---|---|
| 9,466,161 B2 | 10/2016 | Ricci | |
| 10,166,981 B2 | 1/2019 | Horita et al. | |
| 10,252,713 B2 | 4/2019 | Yoshida et al. | |
| 10,607,192 B2 | 3/2020 | Abbas et al. | |
| 10,825,121 B2 | 11/2020 | Ghannam et al. | |
| 10,834,550 B2 | 11/2020 | Makke et al. | |
| 2018/0251122 A1* | 9/2018 | Golston | B60W 50/0098 |
| 2020/0104770 A1 | 4/2020 | Aich et al. | |
| 2020/0130705 A1 | 4/2020 | Boss et al. | |
| 2021/0068737 A1* | 3/2021 | Ghannam | B60W 60/001 |
| 2022/0194426 A1* | 6/2022 | Beaurepaire | G06V 20/588 |

FOREIGN PATENT DOCUMENTS

DE    102019002304 A1    11/2019

* cited by examiner

*Primary Examiner* — Alan D Hutchinson
*Assistant Examiner* — Andy Schneider
(74) *Attorney, Agent, or Firm* — Frank L. Lollo; MacMillan, Sobanski & Todd, LLC

(57) ABSTRACT

A ride-share system of other vehicle system employs a profile database having a plurality of user phobia profiles for potential customers. Each of the user phobia profiles identifies one or more respective phobia groups pertaining to a respective user, wherein each phobia group associates a plurality of driving-related phobias which share at least one trigger condition or at least one countermeasure. A vehicle controller is coupled to the profile database which determines a default itinerary for a trip to a destination specified by one of the users. The vehicle controller evaluates the default itinerary for potential interaction with a respective phobia group identified by the phobia profile of the one of the users. The vehicle controller implements an alternate itinerary that mitigates the potential interaction.

20 Claims, 4 Drawing Sheets

| Clinical Phobia | Phobia Group ID | Potential Trigger Conditions | Types of Countermeasures | Extrinsic Factors |
|---|---|---|---|---|
| Phobia1<br>Phobia2<br>Phobia3 | A | Driving style, driving conditions, motion | Operational limitations (max. speed, accel, left turns, traffic lights), Time-out, Vehicle settings (window tint) | Temperature, forecast, region, traffic congestion |
| Phobia-x<br>Phobia-y<br>Phobia2 | B | Infrastructure (bridges, high rises, tunnels, forests) | Re-routing, Vehicle settings, Distraction | Time of day, Seasonal |
| Phobia-n<br>Phobia-m<br>-- | C | Social (fear of others, fear of being alone) | Grouping preference | Concurrent requests |
| -- | D | -- | -- | -- |
| -- | E | -- | -- | -- |

Fig. 3

| User ID | Group IDs | Highlighted Triggers | Preferred Countermeasures |
|---|---|---|---|
| User0010 | A, H | T020, T013 | CM121, CM006, CM074 |
| -- | | | |

Fig. 4

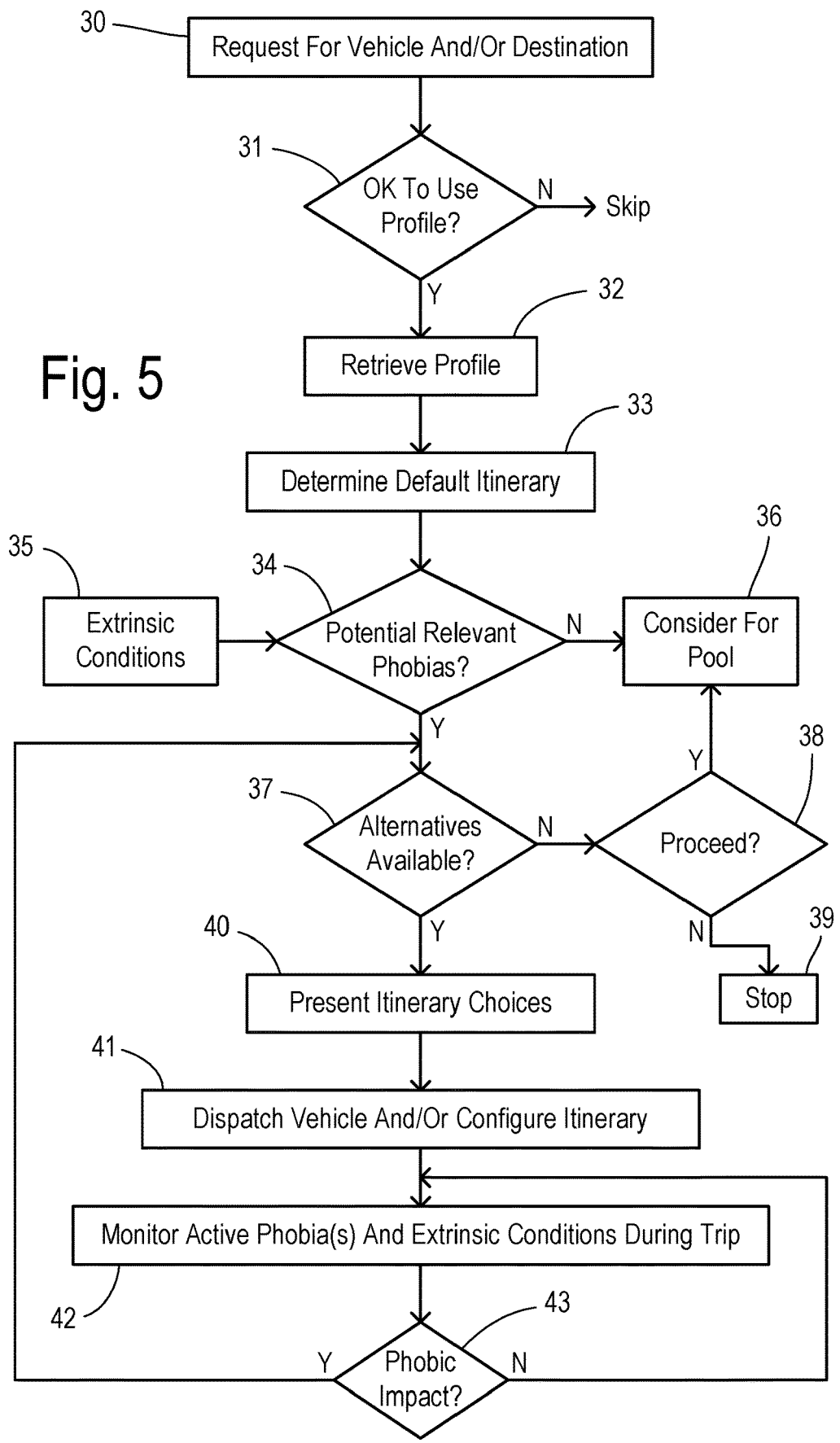

RIDESHARING AND AUTONOMOUS VEHICLE SYSTEMS WITH MITIGATION OF RIDE-RELATED PHOBIAS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to routing of transportation vehicles such as personal vehicles, autonomous vehicles or vehicles of ridesharing services, and, more specifically, to a system for identifying potential phobia triggers for riders and mitigating the triggers in deploying and/or navigational routing of vehicles.

Whether driving or riding as a passenger in a car, truck, bus, or other vehicle, anyone may be subject to different levels of fear or concern that can be triggered for various reasons while traveling (e.g., sounds, scenes, actions, weather, an unexpected change in the road or surroundings, a blind-sharp turn while moving at a fast speed, sudden warning messages or buzzers, etc.). If a person's reaction rises to the level of a phobia, they may have a sudden biological or psychological reaction (such as a temporary state of fear and anxiety, panic, or abrupt body aches) as a result of the trigger. A person having a phobia may often understand that their fear is unfounded, but they may be unable to control it.

When a person knows that they have a certain phobia associated with traveling in a vehicle, the person can try to avoid the known trigger areas or stay away from certain scenes. However, this may be difficult to accomplish in the case of riders of autonomous vehicles (AV) and rideshare vehicles since the person may have little or no control over the driving or routing of the vehicle. When using an AV or engaging a ridesharing service, for example, the phobic user has had to relinquish control such that a ride is conducted without regard to their fear of certain conditions. As a result, the user may have negative feelings about the rides, and might not consider using a ride service or AV again in order to avoid the phobia. Therefore, it would be desirable to reduce or avoid triggers to a user's phobias in order to enhance AV and rideshare opportunities.

In the case of hiring a ridesharing vehicle, a potential customer subject to a phobic condition may be reluctant to reveal personal details that could be used to customize a ride to mitigate the phobia. Therefore, it would be desirable to maximize privacy of personal data while still obtaining sufficient insights to appropriately customize the ride.

SUMMARY OF THE INVENTION

In one aspect of the invention, a vehicle system comprises a profile database having a plurality of user phobia profiles. Each of the user phobia profiles identifies one or more respective phobia groups pertaining to a respective user, wherein each phobia group associates a plurality of driving-related phobias which share at least one trigger condition or at least one countermeasure. A vehicle controller is coupled to the profile database which determines a default itinerary for a trip to a destination specified by one of the users. The vehicle controller evaluates the default itinerary for potential interaction with a respective phobia group identified by the phobia profile of the one of the users. The vehicle controller implements an alternate itinerary that mitigates the potential interaction.

BRIEF DESCRIPTION OF THE DRAWINGS

FIG. 3 shows an embodiment for categorizing and grouping various phobias, triggers, and countermeasures.

FIG. 4 shows an embodiment of a profile record for a user.

FIG. 5 is a flowchart showing an embodiment of a method for routing and/or ridesharing using phobia profiles.

DETAILED DESCRIPTION OF PREFERRED EMBODIMENTS

The invention creates phobia-based profiles for individual users (e.g., riders) in a secure environment. During the set-up and/or execution of driving trips, the invention relates rider phobia profiles to the vehicle driving conditions dynamically, and mitigates their effects by appropriate countermeasures to help in safety and enjoyment of the ride. Many hundreds of types of phobia have been identified by medical professionals. Many phobias may have little relevance to vehicle travel, but even a list of phobias that could be triggered by driving would be very long. For better management, and to reduce or eliminate sensitive personal details from a person's profile, the potential phobias are categorized into a smaller number of phobia groups. The groups may be defined according to, or categorized based on, common countermeasures useful for mitigation and/or potential trigger conditions that are expected to elicit a phobic reaction.

Figure 1:
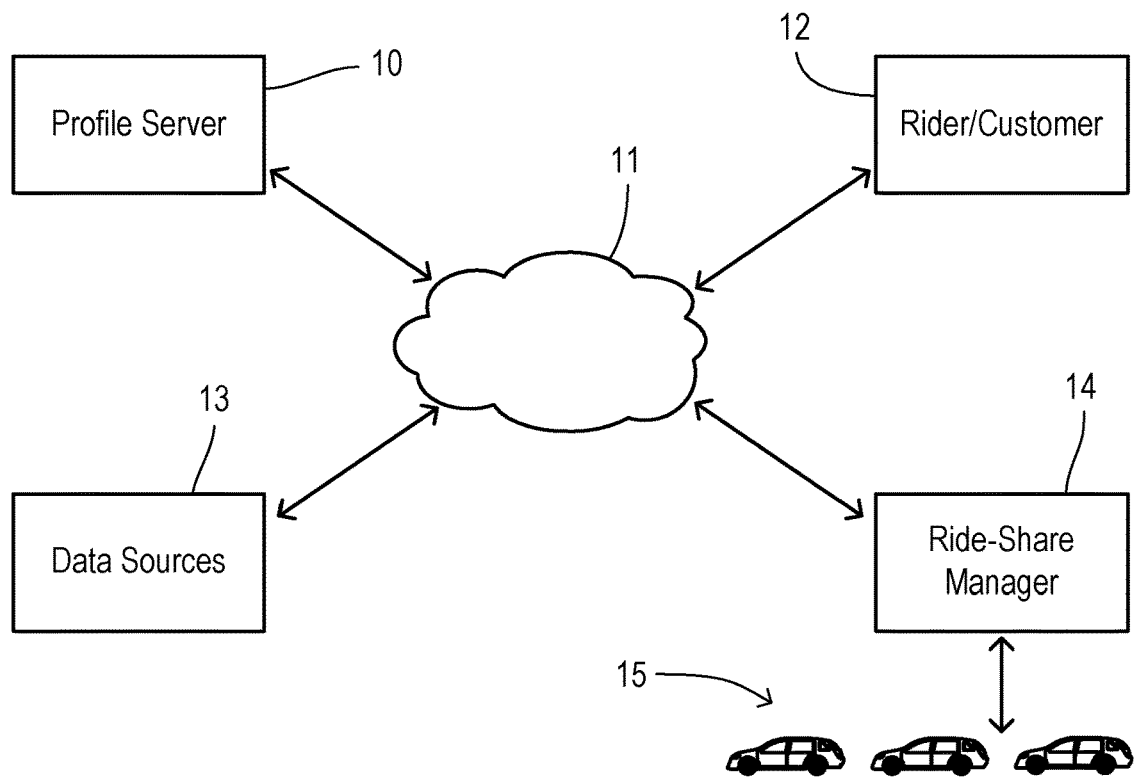
FIG. 1 is a network diagram for an embodiment of an anti-phobias conditioning system.

A network implementation of one embodiment of the invention is shown in FIG. 1. A profile server 10 is linked to a data network 11 (e.g., the Internet or other cloud media) in order to communicate remotely with a computer system of a rider/customer 12, data sources 13, and a ride-share manager 14 which controls a fleet of vehicles 15. Profile server 10 stores a plurality of user phobia profiles. As explained below, each of the user phobia profiles may identify one or more respective phobia groups pertaining to a respective user, wherein each phobia group associates a plurality of driving-related phobias which share at least one trigger condition or at least one countermeasure. Each profile on server 10 can be created and/or modified by actions taken over network 11 by rider/customer input 12 and/or data sources 13. For example, a particular user may access server 10 to create their own user phobia profile according to their own preferences. User access for the direct input by the user of data for their profile can be facilitated by a desktop application, smartphone app, a web or browser-based interface over the cloud, and/or a human-machine interface (HMI) as part of a vehicle electronics system. Alternatively, other data sources 13 may create/edit profiles under the direction of third parties, such as authorized service providers (e.g., dealers, depot services) or authorized medical centers and facilities (e.g., hospitals, medical providers, senior citizen centers). Preferably, the existence and use of any user profile is conditioned upon the approval of the user. Those able to configure and/or modify a user phobia profile such as the respective user, an authorized representative of the user, a transportation service provider, a medical provider or caregiver, a system administrator, or persons associated with a third-party data source are referred to herein as a coordinator.

Availability of a user phobia profile enables a "smart" provision of vehicle transportation taking into account the onboard passenger's phobia profile. A smart vehicle controller may include a ride-share manager/controller 14 (as shown in FIG. 1) or a navigation unit or other driving system in a vehicle in which the user is located (e.g., in the user's own vehicle). In a ride-share system, the user may request (e.g., schedule) a ride for being picked up at an origination location and being dropped off at a destination location. A ride-share vehicle can be an autonomous vehicle, for example. The ride-sharing system can be implemented as disclosed in U.S. Pat. No. 10,825,121 B2 and U.S. Pat. No. 10,607,192 B2, which are incorporated herein by reference in their entirety. Based on the details of a ride request and the user phobia profile of the requester, some embodiments of the invention may utilize potential travel routes (i.e., trip itineraries) together with data characterizing various routing segments obtained from databases or collected by various sensors (e.g., prior to and during a trip), and comparing conditions along potential routes with the user phobia profile. Based on having determined an acceptable route which can be supported, one of fleet vehicles 15 may be dispatched to the location of the user and the requested trip is initiated. Analysis of environmental and driving conditions, and comparison with the user phobia profile may also continue during travel along a route since the conditions may be dynamic. If a conflict is detected between an environmental or driving condition and a related phobia classification, the rider may be asked through an HMI whether help is needed, and corresponding countermeasures may be taken.

Figure 2:
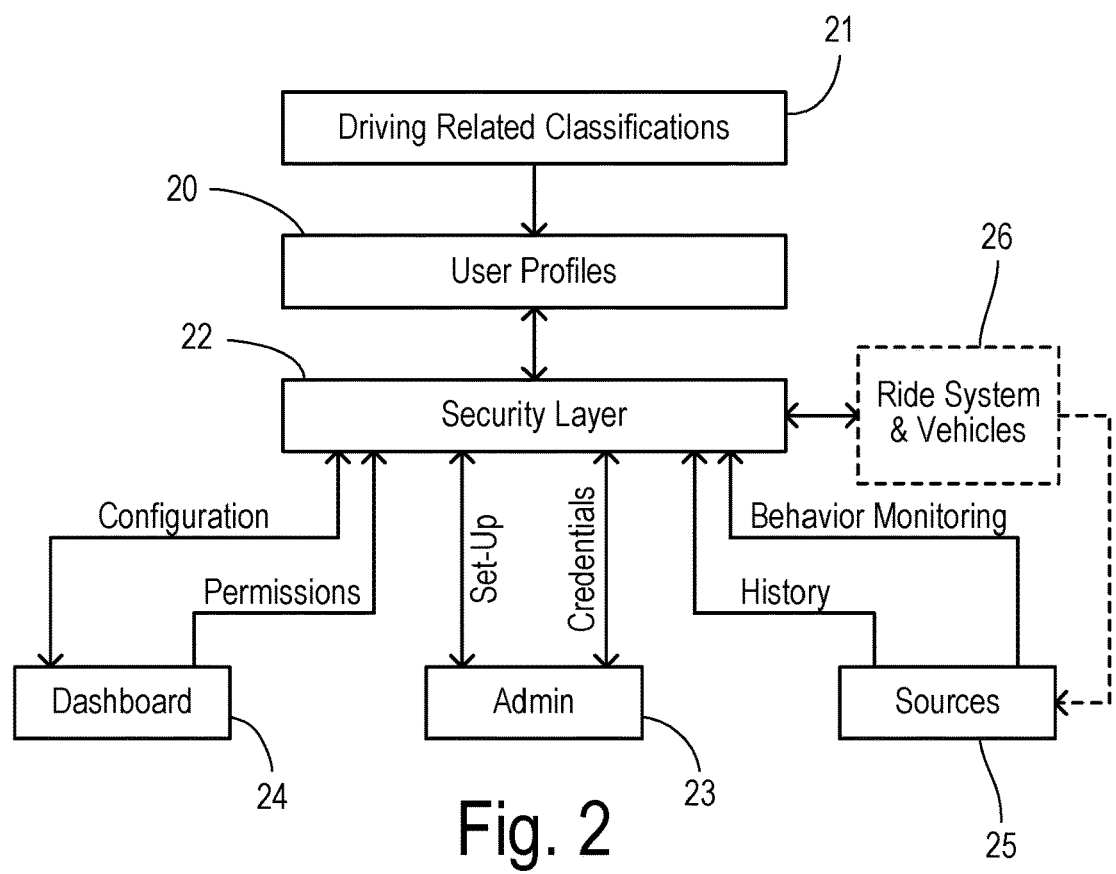
FIG. 2 is a block diagram showing an embodiment of an architecture for creating and using phobia profiles for users.

FIG. 2 shows a profile server in greater detail. A database of user phobia profiles 20 relies on a predefined phobia classification system 21. Classification system 21 defines groups of phobias which are relevant to an aspect of riding or driving in a vehicle. Furthermore, each phobia group associates a plurality of driving-related phobias, wherein phobias within a respective group share at least one trigger condition (i.e., something to be avoided) or at least one countermeasure (i.e., something to mitigate the phobic reactions). Classification system 21 may be published for use during the process of setting up or customizing by the user or third parties. For example, an application program or a profile database manager can be configured to relate various combinations of clinical phobias according to "phobia group identifiers" wherein each recognized phobia is included in one or more of the groups. Thus, each user phobia profile is configured to contain at least one Phobia Group ID. In addition, a user phobia profile may include 1) identification of one or more trigger conditions associated with a selected phobia group to receive elevated consideration in regard to the user, and/or 2) selection of one or more preferred countermeasures deemed particularly effective for the user to obtain relief.

Remote access to set-up, configure, and utilize user phobia profiles 20 is obtained through a security layer 22 that limits access under control of a service administrator 23 and the individual users. Administrator 23 may allocate user credentials to be recognized by security layer 22, wherein authorized users (i.e., coordinators) may include the potential passengers as well as ride-share service providers and third-party data sources which may populate phobia data into respective profiles. With their credentials, individual users can access their phobia profiles through security layer 22 using a dashboard 24 (e.g., a portal working in tandem with a remote app) to perform actions such as configuring their phobia profile and granting third-party access to their profile. Access to the profile may include designating the desired third parties (e.g., ride-share providers and/or data sources) and selecting from predetermined permission modes for that access (e.g., read-only, read-write, etc.). For example, a user may grant write-access to third-party data sources 25 which can provide medical history data. Sources 25 may also provide ongoing data from behavior monitoring to refine the classifications, triggers, and/or countermeasures of respective user phobia profiles. In particular, the behavior monitoring may include data from the ride-share experiences of users of ride-share systems 26. Via the permissions set through dashboard 24, ride-share system 26 can, for example, be granted read-access for configuring ride itineraries as well as write-access as a data source 25.

FIG. 3 shows one embodiment of a cataloging scheme in which clinically-recognized phobias (Clinical Phobias) having potential relevance to vehicle usage situations are mapped in groups to respective Phobia Group IDs. As shown, separate phobias assigned to a Phobia Group ID may share certain Potential Trigger Conditions and/or certain Types of Countermeasures. A particular Phobia Group ID may also have a relationship wherein an analysis of the relevancy of the group, triggers, or countermeasures may depend on the same Extrinsic Factors which can be collected/sensed at the time of planning and/or executing a driving trip. For example, Clinical Phobias designated as Phobia1, Phobia2, and Phobia3 map to a Phobia Group "A". These phobias may be related to fears of certain types of motion (e.g., fast acceleration or deceleration), driving styles, or driving conditions (e.g., busy streets or highways). Relevant countermeasures could include speed/acceleration limits, roadway choice limitations, taking a break during a stressful trip, or tinting windows to obscure the outside view. Extrinsic factors relevant to Group A could include weather details and traffic congestion, for example. Phobia2 is also assigned to a Phobia Group B, such that a person experiencing Phobia2 would in some embodiments be led to making selections in their user phobia profile associated with Phobia Group B. A user phobia profile could also include details such as severity level of a phobia, associated health conditions, frequency of phobia occurrence, or physical "flags" that show user is in a phobia state.

The cataloging scheme can be dynamically updated over time as experience accumulates regarding user feedback and changes in medical knowledge. When changes to groupings or other aspects of the classifications are made, the stored catalog can be rolled out to vehicle data systems (e.g., at the end-of-line or EOL programming in the vehicle control module or vehicle assembly plants, via over-the-air or OTA updating of application software, and/or by adoption at an authorized service center). A grouping catalog could be used by a specific vehicle OEM, or a catalog could be standardized by organizations such as SAE, NHTSA, insurance companies, or medical groups.

FIG. 4 shows a data record from a profile database (e.g., stored on a profile server). A particular individual identified as User 0010 experiences one or more phobias that map to Phobia Groups A and H. The data record optionally includes Highlighted Triggers for use in analyzing potential interactions with the user's phobias, wherein a predetermined list of triggers includes trigger identifiers (e.g., T020 and T013). The data record also optionally includes Preferred Countermeasures from a predetermined list which would be given preferential adoption in planning or executing trip itineraries for User0010.

Without compromising excessive details about individual users, the data provided by user phobia profiles reveals specific conditions pertaining to the user's phobia(s) and makes them available to a vehicle controller system (e.g., a centralized ride-share controller or an on-vehicle navigation system) for use on a "per-trip" basis to plan and execute trips that avoid phobic reactions (provided that the user has given requisite permission for the vehicle controller to use the data for wellness purposes). In a planning process, the vehicle controller uses a target user's phobia profile (possibly with correlated data from the phobias catalog) together with information (e.g., sensor data and information from navigation databases) to determine a suitable route before starting the trip and while executing the trip on the basis of comparisons between the route conditions and the user phobia profile. The vehicle controller may continue running environmental and driving conditions analysis and verifies them against the user profile to potentially revise a trip until the desired destination is reached. Whenever the controller predicts or detects an interaction of a trip with any related phobic condition, it may ask the rider through an onboard HMI whether help is needed, and then the controller can apply anti-phobia countermeasures to manage the phobic-condition and/or redirecting the rider's attention.

FIG. 5 shows a flowchart for one preferred method of the invention. In step 30, a user (i.e., rider or customer) initiates a request for a vehicle trip. The request may be initiated by a user in need of a hired vehicle (e.g., a ride-share vehicle) or a user already in possession of a vehicle for the trip. The request may preferably specify a place of origin and a place of destination. A check is performed in step 31 to determine whether the user has authorized the user of their phobia profile in connection with the trip (e.g., by granting authorization to a particular ride-share service provider). If the use is not authorized (or if the user does not have a preexisting user phobia profile), then the remaining method is skipped.

If use of the phobia profile is authorized, then the user's phobia profile is retrieved in step 32. Based on the requested parameters of the trip (e.g., destination and timing), a default trip itinerary is determined in step 33. As used herein, itinerary may include a turn-by-turn route to be followed by the vehicle along with any pertinent directives such as departure time, speed of travel, stopovers, and the like. The default itinerary can be created using known techniques employed by vehicle navigation systems. In particular, the default itinerary may be determined without consideration of potential phobia triggers or other factors related to the user phobia profile (which are used later to potentially revise the default as needed to avoid potential interactions generated by the trip and any factors related to the phobia profile as described below). Alternatively, phobia triggers and related details could be incorporated into the initial route planning process.

In step 34, the default itinerary is examined for interactions with potentially relevant phobias and/or phobia triggers in view of extrinsic conditions 35 that would be inherent in the default itinerary. In the event that no potential interactions are likely to be triggered, then the user's request might be considered for inclusion in a ride pool in step 36 (if the request is made within a ride-share service which may carry multiple customers over shared portions of different trips). Whether or not included within a pool, the requested trip may proceed according to the default itinerary. In some embodiments, phobia interactions may be monitored during a trip following the default itinerary (e.g., in the manner described below concerning step 42).

The evaluation in step 34 may be performed by a vehicle controller which is coupled to the profile database. The default itinerary (which may have been determined to provide a trip to a destination as specified by one of the users) is examined for potential interaction with a respective phobia group identified by the phobia profile of the user. If potential interaction is found, then the vehicle controller attempts to implement an alternate itinerary that mitigates the potential interaction. The selected mitigation may include itinerary modifications that 1) avoid a trigger condition associated with the Phobia Group ID and/or a trigger condition highlighted in the profile, or 2) containing countermeasures associated with the Phobia Group ID and/or a countermeasure highlighted in the profile. If no suitable alternative is found in step 37, then the user is asked whether they still wish to proceed with the trip in step 38. If so, then the user can be considered for inclusion in a pooled trip in step 36, and the trip is executed (with or without inclusion in a pool). If the user decides not to proceed, then the method ends at step 39.

When one or more alternative itineraries are found to be available in step 37, then they are presented to the user in step 40 (e.g., on a user interface such as a touchscreen display in a vehicle or on the display of a smartphone or laptop of the user). Based on an alternative selected by the user, the chosen itinerary is configured in step 41. The corresponding route and related directives may be executed by a navigation system of the user's vehicle, or a ride-share vehicle can be commanded to pick up the user and execute the corresponding instructions. During the trip in progress, the vehicle controller (e.g., onboard navigation controller or remote systems of a ride-share manager) continues to monitor for active phobias and any associated extrinsic conditions in step 42. A check may be regularly performed in step 43 to determine whether any changes have occurred with a new phobic impact. If a new impact is found, then a return is made to step 37 to examine any potential alternatives which can mitigate the new phobic impact. Monitoring may continue until the final destination of the trip is reached.

In the foregoing method, a vehicle controller may analyze a route using communication over a wireless network (e.g., V2X) to collect extrinsic, environmental data and to predict any possible phobia-based reactions based on predefined types of phobia and user's data. Exterior and interior sensing systems (camera images, voice, seat sensors) can also be used to sense possible symptoms or signs of the subjected phobias related to the rider's information. For example, the vehicle controller can identify bridges/tunnels on the road that might cause phobia to one rider and/or the left turns that might frighten another rider. If road conditions are the source of the phobia (bridge, turns, colors, road depressions), a potential countermeasure will be to change the route to avoid the sources of the phobia.

In connection with ride sharing, it is sometimes difficult to change the route in a way that satisfies multiple riders with different phobias. In response, several rideshare units may fuse their efforts by grouping riders in different vehicles for optimal routes. Where there are multiple riders on different trips, the arrangements of the pickup/drop-off of users can be adjusted to optimize for total time and distance, or to change the route in order to drop off a rider with a most severe phobia first. Customers can be dynamically re-arranged in different car-hailing vehicles to maintain a similar phobia group configuration when a phobia event is approaching. This results in better efficiency and customer satisfaction. For example, if a customer is terrified of tunnels and a car-hailing vehicle is about to enter a tunnel, then the customer could be dropped off and re-arranged to ride a different car hailing vehicle that takes a bridge route. In some embodiments, if the act of changing a route affects the cost of the tip, then the phobic-rider should be the one to compensate for it. Also, if there is a time delay, then the delay should be accepted by the rest of the riders, or the phobic-rider may also compensate the rest of the riders (e.g., vehicle admin lowers the ride cost for the rest of the riders using an up charge to the phobic-rider).

Figure 6:
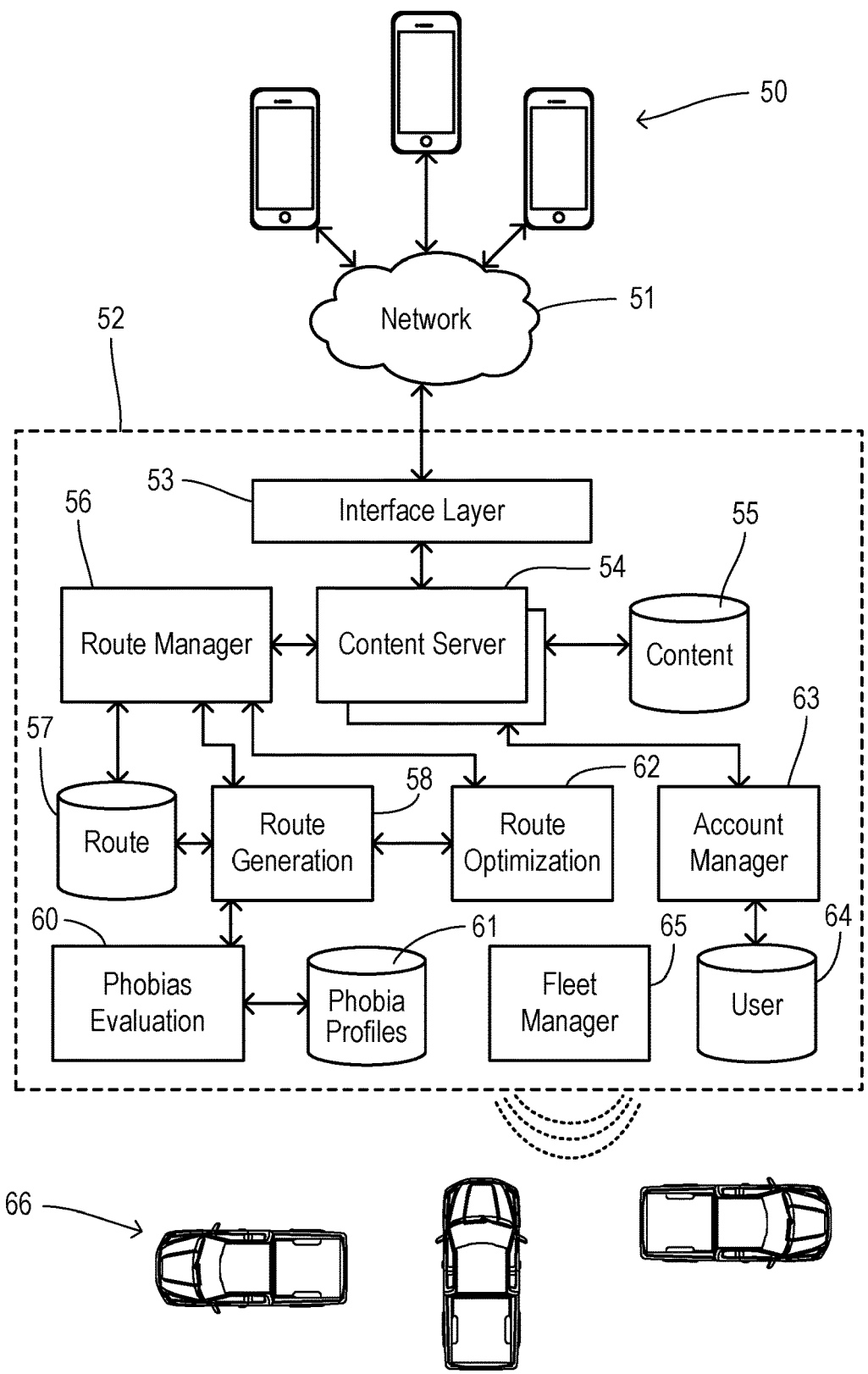
FIG. 6 is a block diagram of an embodiment of a system for performing routing and/or ridesharing using phobia profiles.

As mentioned above, the vehicle controller may be comprised of a ride-sharing system. Ride-sharing may employ route optimization together with phobias mitigation using a system as shown in FIG. 6. In this system, various users (customers) can use software applications executing on various types of computing devices (e.g. smartphones) 50 to submit route requests over at least one network 51 to be received by an interface layer 53 of a service provider environment 52. Computing devices 50 can be any appropriate devices known or used for submitting electronic requests, as may include desktop computers, notebook computers, smartphones, tablet computers, and wearable computers, among other such options. The network(s) can include any appropriate network for transmitting the request, and may include any selection or combination of public and private networks using wired or wireless connections, such as the Internet, a cellular data connection, a Wi-Fi connection, a local area network connection (LAN), and the like. Service provider environment 52 can include any resources known or used for receiving and processing electronic requests, as may include various computer servers, data servers, and network infrastructure. Interface layer 53 can include interfaces (such as application programming interfaces), routers, load balancers, and other components useful for receiving and routing requests or other communications received to the service provider environment. Interfaces and content to be displayed through the interfaces can be provided using one or more content servers 54 capable of serving content (such as web pages or map tiles) stored in a content repository 55 or other location.

Information for a trip request can be directed to a route manager 56, which may include code executing on one or more computing resources, configured to manage aspects of routes to be provided using various vehicles of a vehicle pool or fleet associated with the transport service. Route manager 56 can analyze information for the request, determine available planned routes from a route data store 57 that have capacity that can match the criteria of the request, and can provide one or more options back to the corresponding device 50 for selection by the potential rider. The appropriate routes to suggest can be determined by a route generation block 58 and a phobias evaluation block 60 having access to user phobia profiles 61 and based upon other factors, such as proximity to the origination and destination locations of the request, availability within a determined time window, and the like. An application on a client device 50 may instead present the available options from which a user can select, and the request can instead involve obtaining a seat for a specific planned route at a particular planned time. As mentioned, the bookings or selections can be made by route manager 56 automatically based on various criteria, among other such options.

Users can either suggest route information or provide information that corresponds to a route that would be desired by the user. This can include, for example, an origination location, a destination location, a desired pickup time, and a desired drop-off time. Other values can be provided as well, as may relate to a maximum duration or trip length, maximum number of stops, allowable deviations, and the like. At least some of these values may have maximum or minimum values, or allowable ranges, specified by one or more route criteria. There can also be various rules or policies in place that dictate how these values are allowed to change with various circumstances or situations, such as for specific types of users or locations. Route manager 56 can receive several such requests, and can attempt to determine the best selection of routes to satisfy the various requests. In this example, route manager 56 can work with a route generation module 58 that can take the inputs from the various requests and phobias evaluation block 60 to provide a set of route options that can satisfy those requests. This can include options with different numbers of vehicles, different vehicle selections or placements, different modes of transportation, different segment options, and different options for getting the various customers to their approximate destinations at or near the desired times.

Route generation module 58 can generate a set of routing options based on the received requests for a specified area over a specified period of time. A route optimization module 62 can perform an optimization process using the provided routing options to determine an appropriate set of routes to provide in response to the various requests. Such an optimization can be performed for each received request, in a dynamic routing system, or for a batch of requests, where users submit requests and then receive routing options at a later time. This may be useful for situations where the vehicle service attempts to have at least a minimum occupancy of vehicles or wants to provide the user with certainty regarding the route, which may specify a quorum of riders for each specific planned route. Optimization may further consider impacts on phobia interactions which result from each of the passengers being pooled together, which are obtained from phobias evaluation block 60.

In connection with each trip being provided, an account manager may collect a corresponding payment from each user 64. A fleet manager 65 receives instructions according to the optimized routes and other directives in completing respective trips. Accordingly, fleet manager 65 dispatches vehicles within a vehicle fleet 66 to transport the users. As a benefit of the availability of user phobia profiles, the ride-share system can dispatch a vehicle to convey a pool of customers together for a shared itinerary, wherein the customers of the pool are determined to have user phobia profiles that are compatible with each other and with the shared itinerary.

What is claimed is:

1. A vehicle system comprising:
   a profile database having a plurality of user phobia profiles, each of the user phobia profiles identifying one or more respective phobia groups pertaining to a respective user, wherein each phobia group associates a plurality of driving-related phobias which share at least one trigger condition or at least one countermeasure; and
   a vehicle controller coupled to the profile database which i) determines a default itinerary for a trip to a destination specified by one of the users, ii) evaluates the default itinerary for potential interaction with a respective phobia group identified by the phobia profile of the one of the users, and iii) implements an alternate itinerary that mitigates the potential interaction.

2. The system of claim 1 further comprising:
a dashboard interface coupled to the profile database which is accessible to a coordinator to configure a respective user phobia profile.

3. The system of claim 2 wherein the coordinator is comprised of one of a group comprising the respective user, an authorized transportation-service provider, an authorized medical provider, and an authorized caregiver.

4. The system of claim 2 wherein the dashboard interface is configured to provide selection of a phobia group.

5. The system of claim 4 wherein the dashboard interface is further configured to provide selection of a trigger condition associated with a selected phobia group and selection of a preferred countermeasure.

6. The system of claim 2 wherein the dashboard interface is configured to provide selection of a predetermined permission mode for accessing a respective user phobia profile.

7. The system of claim 1 further comprising:
a behavior database coupled to the profile database to collect behaviors of the respective user and to accordingly adjust the respective phobia profile of the respective user.

8. The system of claim 7 wherein behaviors collected for the respective user are comprised of an action by the respective user associated with a previous trip specified and taken by the respective user.

9. The system of claim 1 wherein the vehicle controller comprises a ride-share manager receiving ride requests from a plurality of customers including one or more customers having respective user phobia profiles, wherein the ride-share manager dispatches a vehicle to convey a pool of the customers together for a shared itinerary, and wherein the customers of the pool are determined to have user phobia profiles that are compatible with each other and with the shared itinerary.

10. The system of claim 9 wherein the user phobia profiles each has a respective predetermined permission mode which grants access to the ride-share manager.

11. A method for routing a vehicle, comprising the steps of:
creating a plurality of user phobia profiles, each of the user phobia profiles identifying one or more respective phobia groups pertaining to a respective user, wherein each phobia group associates a plurality of driving-related phobias which share at least one trigger condition or at least one countermeasure;
a requestor specifying a destination for a trip which is to be provided by a vehicle;
determining a default itinerary for a trip to the destination;
evaluating the default itinerary for potential interaction with a respective phobia group identified by the user phobia profile of the requestor; and
when the evaluating for potential interaction detects a relevant phobia, then implementing an alternate itinerary that mitigates the potential interaction.

12. The method of claim 11 wherein the plurality of user phobia profiles are stored as a profile database in a central server, and wherein the creating of user phobia profiles is comprised of:
securely accessing a dashboard interface coupled to the profile database to configure a respective user phobia profile.

13. The method of claim 12 wherein the dashboard interface is configured to receive selection of a phobia group.

14. The method of claim 13 wherein the dashboard interface is further configured to receive selection of a trigger condition associated with a selected phobia group and selection of a preferred countermeasure.

15. The method of claim 12 wherein the dashboard interface is configured to provide selection of a predetermined permission mode for accessing a respective user phobia profile.

16. The method of claim 11 further comprising:
collecting behaviors of one of the respective users indicative of phobias; and
accordingly adjusting the respective phobia profile of the respective user in response to the collected behaviors.

17. The method of claim 16 wherein behaviors collected for the respective user are comprised of an action by the respective user associated with a previous trip specified and taken by the respective user.

18. The method of claim 11 further comprising the steps of:
a ride-share manager receiving ride requests from a plurality of customers including one or more customers having respective user phobia profiles;
the ride-share manager dispatching a vehicle to convey a pool of the customers together for a shared itinerary, wherein the customers of the pool are determined to have user phobia profiles that are compatible with each other and with the shared itinerary.

19. The method of claim 18 wherein the user phobia profiles each has a respective predetermined permission mode which grants access to the ride-share manager.

20. The method of claim 11 further comprising the steps of:
monitoring extrinsic conditions during navigation of the trip;
detecting a change of the extrinsic conditions during navigation of the trip that revises potential interaction with the relevant phobia; and
determining an updated itinerary that mitigates the revised potential interaction.

\* \* \* \* \*